United States Patent
Butscher

(10) Patent No.: US 9,874,579 B1
(45) Date of Patent: Jan. 23, 2018

(54) HEAT EXCHANGER SYSTEM FOR AN INERTIAL MEASUREMENT UNIT

(71) Applicant: The Boeing Company, Chicago, IL (US)

(72) Inventor: Stephen T. Butscher, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 262 days.

(21) Appl. No.: 14/728,103

(22) Filed: Jun. 2, 2015

(51) Int. Cl.
  *G01P 3/00* (2006.01)
  *G01P 1/00* (2006.01)

(52) U.S. Cl.
  CPC .................... *G01P 1/006* (2013.01)

(58) Field of Classification Search
  CPC ....................................................... G01P 1/006

USPC ................... 73/497, 504.09, 504.18; 74/5 R; 244/3.2; 318/649
  See application file for complete search history.

(56) References Cited

U.S. PATENT DOCUMENTS

2011/0205703 A1* 8/2011 Weaver ................ G03B 15/006
  361/695

* cited by examiner

*Primary Examiner* — Walter L Lindsay, Jr.
*Assistant Examiner* — Ruth Labombard
(74) *Attorney, Agent, or Firm* — MH2 Technology Law Group LLP

(57) ABSTRACT

An inertial measurement unit includes a spherical gimbal system and a heat exchanger system that cool components of the spherical gimbal system without affecting the operations of the spherical gimbal system. The heat exchanger system can be configured to flow chilled air to the components of the spherical gimbal system by using the spherical gimbals as transport pathways for the chilled air and the returned heated air.

20 Claims, 4 Drawing Sheets

HEAT EXCHANGER SYSTEM FOR AN INERTIAL MEASUREMENT UNIT

BACKGROUND

An inertial measurement unit ("IMU") is an electronic device that measures and reports a craft's velocity, orientation, and gravitational forces, using a combination of accelerometers, gyroscopes, and magnetometers. One type of IMU includes a spherical gimbal system. The spherical gimbal system includes several gimbal shells of decreasing size placed within each other, and electronics located in the center of the spherical gimbal system. In operation, the electronics of the gimbal system produce heat that can alter the operation of the gimbal system. To cool the gimbal system, fans can be placed on or near the electronics of the gimbal system. The fans, however, provide vibration that can alter the operation of the gimbal system. Also, the fans can be placed external to the gimbal system and air can be blown onto the gimbal system. In this case, the gimbal shells, themselves, can shadow the fans and prevent the airflow from reaching the electronics.

Accordingly, there is a need for a system that effectively cools an IMU without affecting the operation of the IMU.

SUMMARY

According to aspects of the present disclosure an inertial measurement system includes a spherical gimbal system. The spherical gimbal system includes an outer gimbal shell, a middle gimbal shell positioned inside the outer gimbal shell, and an inner gimbal shell positioned inside the middle gimbal shell. The inner gimbal shell provides a stable platform for one or more components of the spherical gimbal system. The inertial measurement system also includes a heat exchanger system coupled to the spherical gimbal system. The heat exchanger system provides a cooling flow through the outer gimbal shell and the middle gimbal shell to cool the one or more components.

Further, according to aspects of the present disclosure a spherical-shaped gimbal includes a heat exchange feature. The spherical-shaped gimbal includes an outer gimbal structure, and an inner gimbal structure pivotally coupled about a first axis via an annular component, through which a supply of cooling airflow is communicated to an inlet in a stable member positioned within the inner gimbal structure. The stable member has a plurality of apertures in an outer surface through which airflow in the stable member is expelled, to thereby permit removal of heat from within the stable member.

Additionally, according to aspects of the present disclosure an inertial measurement system includes a spherical gimbal system. The spherical gimbal system includes one or more gimbals and one or more components. The one or more gimbals are configured to transfer airflow through the one or more gimbals to the one or more components. The spherical gimbal system also includes a heat exchanger system coupled to the one or more gimbal system. The heat exchanger system provides the airflow to the spherical gimbal system.

DETAILED DESCRIPTION

For simplicity and illustrative purposes, the principles of the present disclosure are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific examples of various implementations. Logical and structural changes can be made to the examples of the various implementations without departing from the spirit and scope of the present disclosure. The following detailed description is, therefore, not to be taken in a limiting sense and the scope of the present disclosure is defined by the appended claims and their equivalents.

According to aspects of the present disclosure, an inertial measurement unit, including a spherical gimbal system, can include a heat exchanger system that cool components of the spherical gimbal system without affecting the operations of the spherical gimbal system. The heat exchanger system can be configured to flow chilled air to the components of the spherical gimbal system by using the spherical gimbals as transport pathways for the chilled air and the returned heated air.

By using the spherical gimbals as transport pathways, the components of the spherical gimbal system can be cooled without affecting the operation of the spherical gimbal system. Likewise, because the air is transported through the spherical gimbals, the spherical gimbals, themselves, do not impede the cooling processes.

Figure 1A:
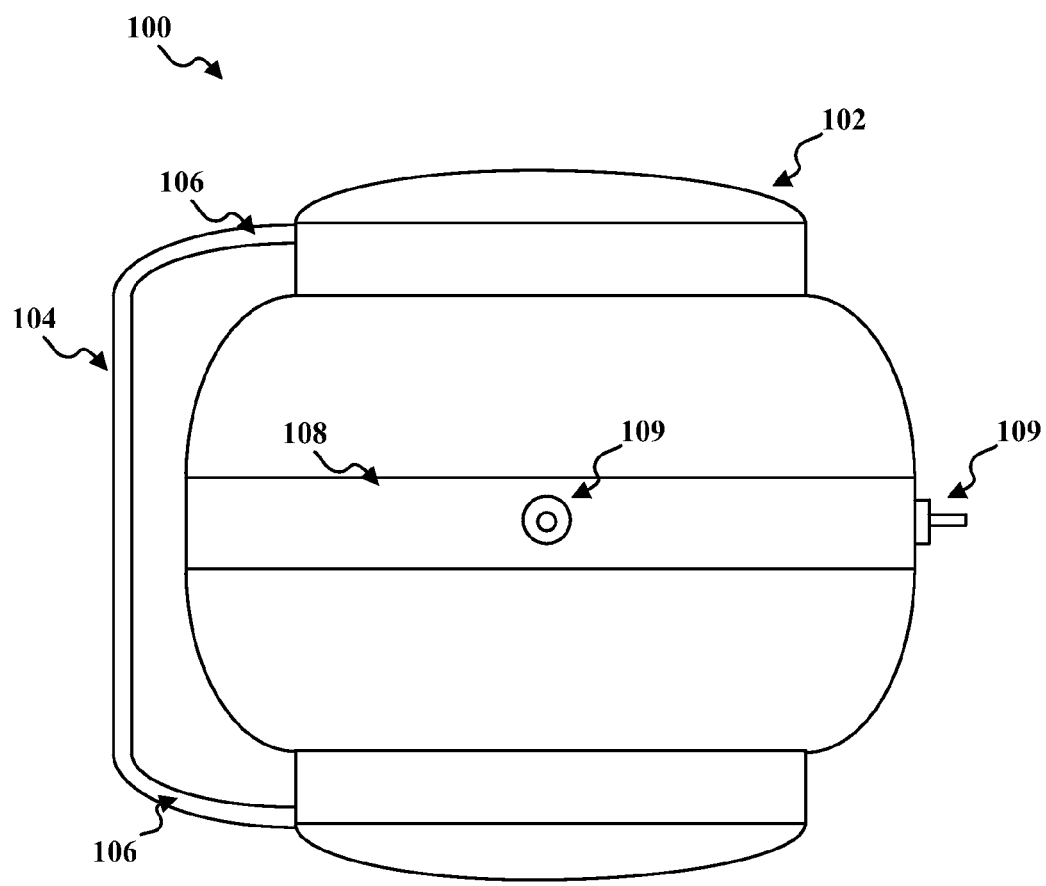
FIGS. 1A and 1B illustrate an example of an inertial measurement system according to aspects of the present disclosure.

FIG. 1A illustrates an example of an inertial measurement unit (IMU) 100, according to aspects of the present disclosure. While FIG. 1A illustrates various components contained in the IMU 100, FIG. 1 illustrates one example of an inertial measurement unit and additional components can be added and existing components can be removed.

As illustrated in FIG. 1A, the IMU 100 can include a housing 102. The housing 102 houses a spherical gimbal system for inertial guidance. The IMU 100 can also include a heat exchanger system 104. The heat exchanger system 104 can be configured to cool the components of the spherical gimbal system by circulating chilled air through the IMU 100 by convection. That is, the heat exchanger system 104 can be configured to circulate chilled air within the spherical gimbal system and draw the heated air back out the spherical gimbal system.

The IMU 100 can also include airflow ducting 106. The airflow ducting 106 can be configured to transport the chilled air from the heat exchanger system 104 into the interior of the IMU 100. In some aspects, the airflow ducting 106 can include an upper ducting and lower ducting that connects the heat exchanger system 104 to an upper mount and a lower mount of the spherical gimbal system. The heat exchanger system 104 forces the chilled air through the airflow ducting 106 to the upper mount and the lower mount into the spherical gimbal system. The airflow ducting 106 can be configured to any dimension and shape to allow the chilled air to be transported from the heat exchanger system 104 to the spherical gimbal system.

The IMU 100 can also include a return ducting 108. The return ducting 108 can be configured to transport the heated air, after cooling of the components, to the heat exchanger system 104. In some aspects, the return ducting 108 can be configured as an annular ring around the housing 102. The return ducting 108 allows the heated air to be drawn from the spherical gimbal system back to the heat exchanger system 104. The airflow ducting 106 can be configured to any dimension and shape to allow the heated air to be transported from the spherical gimbal system to the heat exchanger system 104.

The IMU 100 can also include one or more mounts 109. The one or more mount 109 can be configured to allow the IMU 100 to be mounted into a craft, for example, a missile, an aircraft, etc. The one or mounts 109 can be configured to provide shock isolation so that the movement of the craft does not affect the operation of the IMU 100.

Figure 1B:
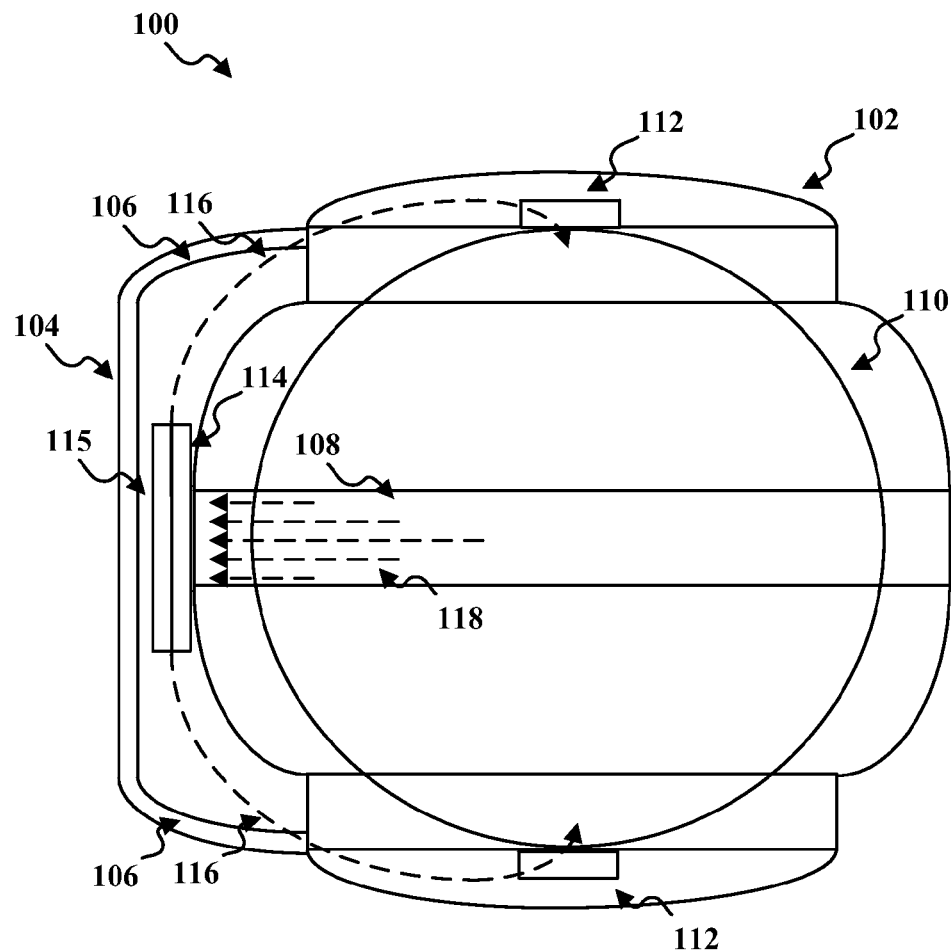

FIG. 1B illustrates a partial internal view of the IMU 100. As illustrated, the IMU 100 can include a spherical gimbal system 110. The spherical gimbal system 110 can be coupled to the housing 102 by mounts 112. The spherical gimbal system 110 can be a 3-axis gimbal that includes one or more spherical gimbals positioned within each other. In some aspects, the spherical gimbal system 110 can include an outer gimbal shell and a middle gimbal shell positioned inside the outer gimbal shell. The outer and middle shells can be mounted to allow the outer gimbal shell and the middle gimbal shell to rotate in one or more directions. The spherical gimbal can also include an inner gimbal shell positioned inside the middle gimbal shell. The inner gimbal shell can be mounted to be stable and can include components of the spherical gimbal system 110. The components of the spherical gimbal system 110 can include any mechanical, electrical, and electro-mechanical systems and devices to aid in the operation of the spherical gimbal system 110. For example the components of the spherical gimbal system can include accelerometers, gyroscopes, magnetometers, stellar sensors, angular rate sensors, global positioning sensors, and the like.

The heat exchanger system 104 can include one or more fans 114. The one or more fans 114 can be configured to circulate airflow within the IMU 100. The heat exchanger system 104 can also include one or more heat exchangers 115. The one or more heat exchangers 115 can be configured to cool the airflow generated by the one or more fans 114. In some aspects, the one or more heat exchangers 115 can include a radiator system that circulates a fluid through a radiator. The radiator system transfers heat from the air within the IMU 100 to the fluid in the radiator system. In some aspects, the one or more heat exchangers 115 can include a heat sink system that conducts heat out of the IMU 100.

As illustrated, the heat exchanger system 104 can be configured to flow chilled air through airflow ducting 106. In some aspects, the airflow ducting 106 can be coupled to the one or more heat exchangers 115 and the one or more fans 114. The airflow ducting 106 can also be coupled to the mounts 112. The mounts 112 can include pathways that allow air to flow to internal spaces of the spherical gimbal system 110, as further described below. The airflow ducting 106 can include an upper ducting and lower ducting that connects the heat exchanger system 104 to the mounts 112 of the spherical gimbal system 110. The one or more fans 114 can flow air, chilled by the one or more heat exchangers 115, through the airflow ducting 106 along a path 116 to the mounts 112.

As illustrated, the heat exchanger system 104 can be configured to draw the heated air from the spherical gimbal system 110. The return ducting 108 can be coupled to the one or more heat exchangers 115 and the one or more fans 114. The return ducting 108 allows the heated air to be drawn, along a path 118, from the spherical gimbal system 110 back to the heat exchanger system 104.

Figure 2:
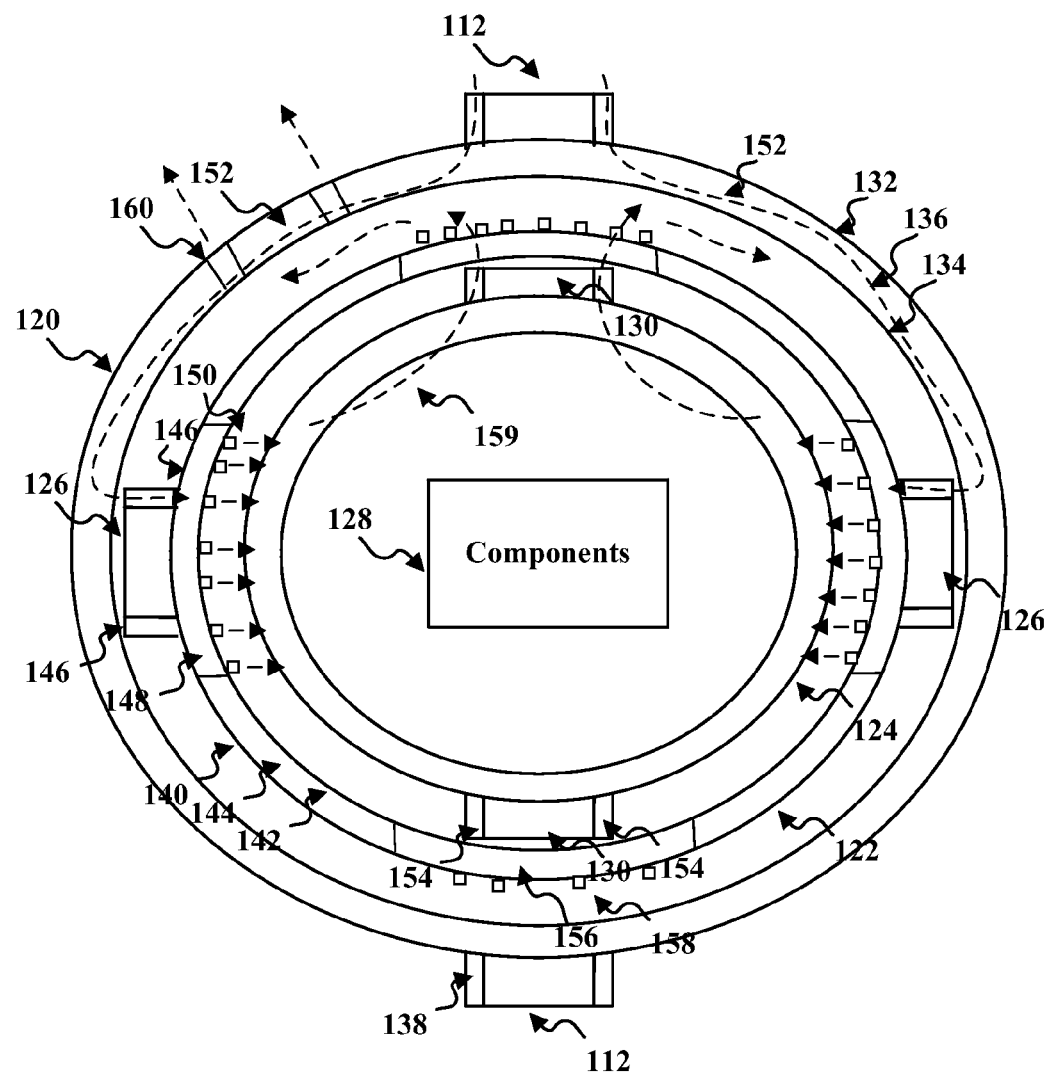
FIG. 2 illustrates an example of a spherical gimbal system according to aspects of the present disclosure.

FIG. 2 illustrates a cross section view of the spherical gimbal system 110 and the flow of air within the IMU 100. As illustrated, the spherical gimbal system 110 can be coupled to the housing 102 by the mounts 112. The spherical gimbal system 110 can include an outer gimbal shell 120 and a middle gimbal shell 122 positioned inside the outer gimbal shell. The outer gimbal shell 120 and the middle gimbal shell 122 can be mounted to allow the outer gimbal shell 120 and the middle gimbal shell 122 to measure two degrees of freedom. The outer gimbal shell 120 can be coupled to the housing 102 by the mounts 112. The middle gimbal shell 122 can be coupled to the outer gimbal shell 120 by mounts 126.

The spherical gimbal system 110 can also include an inner gimbal shell 124 positioned inside the middle gimbal shell 122. The inner gimbal shell 124 can be mounted to be stable and can include components 128 of the spherical gimbal system 110. The inner gimbal shell 124 can be mounted to the middle gimbal shell by mounts 130. The components 128 of the spherical gimbal system 110 can include electronics, for example, accelerometers, gyroscopes, magnetometers, stellar sensors, angular rate sensors, global positioning sensors, and the like.

The outer gimbal shell 120 can be formed of an outer shell 132 and an inner shell 134. The outer shell 132 and the inner shell 134 can form a cavity 136 within the outer gimbal shell 120. In aspects, the cavity 136 can be utilized to transport the chilled air into the spherical gimbal system 110. As illustrated, the heat exchanger system 104 flows chilled air through the airflow ducting 106 to pathways 138 in the mounts 112. The pathways 138 provide access to the cavity 136 in the outer gimbal shell 120.

The middle gimbal shell 122 can be formed of an outer shell 140 and an inner shell 142. The outer shell 140 and the inner shell 142 can form a cavity 144 within the middle gimbal shell 122. The mounts 126 of the middle gimbal shell can include pathways 146. The cavity 144 also include an air transfer region 148 formed with in the cavity 144 and coupled to the pathways 146. The air transfer region 148 included pathways 150 formed through the inner shell 142 of the middle gimbal shell 122. The air transfer region 148 can be configured to transfer the air flow through the middle gimbal shell 122 to the inner gimbal shell 124. The air transfer region 148 can be formed in any size and dimension to provide airflow to the inner gimbal shell 124. In some aspects, the air transfer region 148 can be a ring found around the cavity 144 coupled to the pathways 146 of both mounts 126.

As illustrated, once entering the cavity 136, the air flows through the cavity 136 along a path 152 to the pathways 146 entering the air transfer region 148. The air then flows through the pathways 150 of the air transfer region 148 onto the inner gimbal shell 124 including the components 128. The air serves to cool the components 128 of the inner gimbal shell 124.

The mounts 130 of the inner gimbal shell 124 can include pathways 154. The pathways 154 allow the heated air to be drawn back out of the spherical gimbal system by the heat exchanger system 104. The pathways 154 can be coupled to an air transfer region 156 formed with in the cavity 144. The air transfer region 156 included pathways 158 formed through the outer shell 140 of the middle gimbal shell 122. The air transfer region 156 can be configured to transfer the air flow from the inner gimbal shell 124, through the middle gimbal shell 122, to a space between the middle gimbal shell 122 and the outer gimbal shell 120. The air transfer region 156 can be formed in any size and dimension to provide airflow from the inner gimbal shell 124. In some aspects, the air transfer region 156 can be a ring found around the cavity 144 coupled to the pathways 154 of both mounts 130.

As illustrated, the air transfer region 156 can be configured to transfer the air flow, along path 159, from the inner gimbal shell 124, through the middle gimbal shell 122, to the space between the middle gimbal shell 122 and the outer gimbal shell 120. The outer gimbal shell 120 can also includes pathways 160 formed between the inner shell 134 and the outer shell 132 of the outer gimbal shell 120. The pathways 160 are formed to be isolated from the cavity 136, transporting the chilled air. The pathways 160 can be formed in any shape and dimension to transfer the heated air through the outer gimbal shell 120. In some aspects, the pathways 160 can be cylindrically shaped. The outer gimbal shell 120 can include any number of pathways 160 to efficiently transfer the heated air through the outer gimbal shell 120.

As illustrated, once the heated air enter the space between the middle gimbal shell 122 and the outer gimbal shell 120, the heat exchanger system 104 can draw the heated air through the pathways 160 into a space between the housing 102 of the IMU 100 and the outer gimbal shell 120. The heated air can then be drawn into the return ducting 108 and returned to the heat exchanger system 104. The heat exchanger system 104 can then cool the heated air and return chilled air via the airflow ducting 106.

While the IMU 100 was described above as including concentric gimbal shells, the IMU 100 can include gimbals of different configurations. For example, one or more of the gimbal shells can be replaced with gimbal rings in which the pathways described above are formed.

Figure 3:
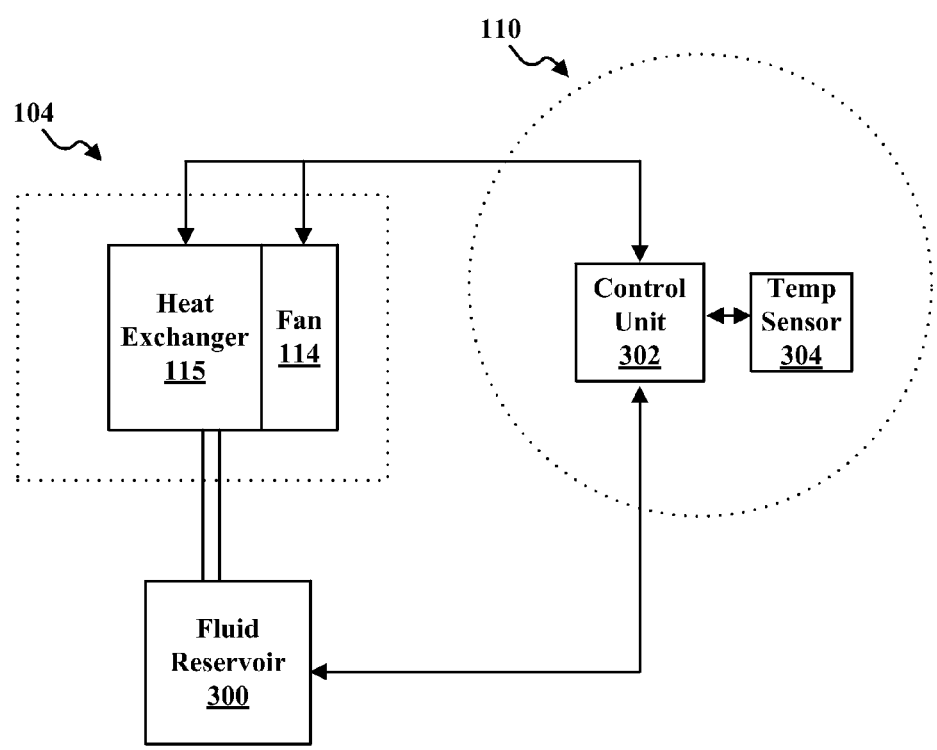
FIG. 3 illustrates an example of a heat exchanger system according to various aspects of the present disclosure.

FIG. 3 illustrates an example of the heat exchanger system 104 according to various aspects. While not illustrated, any of the components described above can be included. As illustrated, the heat exchanger 115 of the heat exchanger system 104 can be coupled to a fluid reservoir 300. The fluid reservoir 300 can be configured to supply fluid to the heat exchanger 115 in order to cool air received by the heat exchanger. The fluid reservoir 300 can be configured to alter the temperature of the fluid. In some aspects, the fluid reservoir 300 can include one or more cooling systems. For example, the one or more cooling systems can include one or more fans, one or more heat exchanger, one or more refrigeration systems, one or more heat pumps, and the like. If the air temperature needs to be reduced, the fluid reservoir 300 can lower the temperature of the fluid using the one or more cooling systems. In some aspects, the fluid reservoir 300 can also include one or more heating systems. For example, the one or more heating systems can include one or more electrical or electro-mechanical heaters, one or more heat pumps, one or more heat exchangers, and the like. If the air temperature needs to be raised, the fluid reservoir 300 can raise the temperature of the fluid using the one or more heating systems.

As illustrated, the spherical gimbal system 110 can include a control unit 302 and one or more temperature sensors 304. The temperature sensors 304 can be configured to measure the temperature at one or more locations in the spherical gimbal system 110. The control until 302 can be coupled to the temperature sensors 304, the heat exchanger 115, the fan, 114, and the fluid reservoir 300. While illustrated as being located in the spherical gimbal system 110, the control unit 302 can be positioned at any location in the IMU 100.

The control unit 302 can be configured to acquire the temperature from temperature sensors 304. The control unit 302 can utilize the temperature to control the operations of the temperature sensors 304, the heat exchanger 115, the fan, 114, and the fluid reservoir 300. For example, the control unit 302 can increase or decrease the cooling process in response to the temperature in the spherical gimbal system 110.

In some aspects, the control until 302 can control and alter the operation of the fan 114. For example, the control unit 302 can increase or decrease the speed of the fan 114. In some aspects the control unit 302 can control and alter the operation of the heat exchanger 115. In some aspects, the control unit 302 can control and alter the operation of the fluid reservoir 300. For example, the control unit 302 can control the fluid reservoir to alter the temperature of the fluid.

In aspects described above, the cooling systems and processes are described with reference to "air" being used in the cooling processes. The cooling systems and processes, however, are not limited to "air" as understood in the art. In aspects, any type of fluid and/or gas can be utilized in the systems and processes described above.

While aspects have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:
1. An inertial measurement system, comprising:
   a spherical gimbal system comprising:
      an outer gimbal shell,
      a middle gimbal shell positioned inside the outer gimbal shell, and
      an inner gimbal shell positioned inside the middle gimbal shell, the inner gimbal shell providing a stable platform for one or more components of the spherical gimbal system; and
   a heat exchanger system coupled to the spherical gimbal system, wherein the heat exchanger system provide a cooling flow through the outer gimbal shell and the middle gimbal shell to cool the one or more components.

2. The inertial measurement system of claim 1, wherein the outer gimbal shell comprises:
   an outer shell;
   an inner shell coupled to the outer shell to form a cavity between the outer shell and the inner shell; and
   one or more mounts coupled to the outer shell, the one or more mounts including pathways coupled to the cavity, wherein the heat exchanger provides the cooling flow through the cavity to the one or more components.

3. The inertial measurement system of claim 2, further comprising:
   one or more ducts coupled to the pathways in the one or more mounts, wherein the heat exchanger provides the cooling flow to the pathways via the one or more ducts.

4. The inertial measurement system of claim 2, wherein the outer gimbal shell comprises:
   a plurality of pathways, through the cavity coupled, to the outer shell and the inner shell, wherein heated air, from the one or more components, returns to the heat exchanger system via the plurality of pathways.

5. The inertial measurement system of claim 2, wherein the middle gimbal shell comprises:
   an inner shell;
   an outer shell coupled to the inner shell to form a cavity, the cavity including an airflow transfer region;
   one or more mounts; and
   one or more mounts coupled to the outer shell of the middle gimbal shell, the one or more mounts including second pathways coupled to the airflow transfer region, wherein the cooling flow is transferred to the inner gimbal shell via the airflow transfer region.

6. The inertial measurement system of claim 5, wherein the airflow transfer region is an annular ring formed within the cavity of the middle gimbal shell.

7. The inertial measurement system of claim 5, the inner gimbal shell comprising:
   one or more mounts, the one or more mounts including third pathways coupled to a second airflow transfer region formed in the cavity of the middle gimbal shell, wherein heated air from the one or more components is transferred through the second airflow transfer region to a space between the outer gimbal shell and the middle gimbal shell.

8. The inertial measurement system of claim 7, wherein the second airflow transfer region is an annular ring formed within the cavity of the middle gimbal shell.

9. The inertial measurement system of claim 1, wherein the heat exchanger system includes a heat exchanger and a fan.

10. The inertial measurement system of claim 1, further comprising:
    one or more temperature sensors; and
    a control unit coupled to the one or more temperature sensors and the heat exchanger system, wherein the control unit is configured to control operation of the heat exchanger system in response to temperatures sensed by the one or more temperature sensors.

11. The inertial measurement system of claim 10, further comprising:
    a fluid reservoir coupled to the heat exchanger system, wherein the fluid reservoir provides cooling fluid to the heat exchanger system and wherein the control unit is configured to control the temperature of the cooling fluid in response to the temperatures sensed by the one or more temperature sensors.

12. The inertial measurement system of claim 1, wherein the one or more components comprise one or more of an accelerometers, a magnetometer, a stellar sensor, an angular rate sensor, and a global positioning sensor.

13. A spherical-shaped gimbal including a heat exchange feature, comprising:
    an outer gimbal structure; and
    an inner gimbal structure pivotally coupled about a first axis via an annular component, through which a supply of cooling airflow is communicated to an inlet in a stable member positioned within the inner gimbal structure, wherein the stable member has a plurality of apertures in an outer surface through which airflow in the stable member is expelled, to thereby permit removal of heat from within the stable member.

14. The spherical-shaped gimbal of claim 13, further comprising a fan positioned external to the inner gimbal structure and adjacent to the annular component, for establishing airflow across a chiller and through a center of the annular component.

15. The spherical-shaped gimbal of claim 13, wherein the cooling airflow is communicated to an interior portion of the inner gimbal structure, the interior portion defining a passage for directing the cooling airflow towards the inlet in the stable member.

16. The spherical-shaped gimbal of claim 13, wherein the inlet in the stable member comprises a second annular component pivotally coupling the inner gimbal structure to the stable member, such that cooling airflow is communicated through the second annular component into an interior of the stable member, to thereby establish airflow for removal of heat generated within the stable member.

17. An inertial measurement system, comprising:
    a spherical gimbal system comprising one or more gimbals and one or more components, wherein the one or more gimbals are configured to transfer airflow through the one or more gimbals to the one or more components; and
    a heat exchanger system coupled to the one or more gimbal system, the heat exchanger system providing the airflow to the spherical gimbal system.

18. The inertial measurement system of claim 17, wherein at least one of the one or more gimbals is configured to transfer the airflow internally.

19. The inertial measurement system of claim 17, wherein the airflow comprises a liquid or a gas.

20. The inertial measurement system of claim 17, wherein the heat exchanger system includes a heat exchanger and a fan.

* * * * *